(12) United States Patent
Oliver

(10) Patent No.: US 9,264,774 B2
(45) Date of Patent: Feb. 16, 2016

(54) SEAMLESS MULTI-CHANNEL TV EVERYWHERE SIGN-IN

(71) Applicant: Verizon Patent and Licensing Inc., Basking Ridge, NJ (US)

(72) Inventor: Michael R. Oliver, Wayne, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 80 days.

(21) Appl. No.: 13/964,421

(22) Filed: Aug. 12, 2013

(65) Prior Publication Data

US 2015/0046939 A1 Feb. 12, 2015

(51) Int. Cl.
- H04N 7/16 (2011.01)
- H04N 7/173 (2011.01)
- H04N 21/4627 (2011.01)
- H04N 21/258 (2011.01)

(52) U.S. Cl.
CPC ..... *H04N 21/4627* (2013.01); *H04N 21/25875* (2013.01)

(58) Field of Classification Search
USPC .......................................................... 725/75
See application file for complete search history.

(56) References Cited

U.S. PATENT DOCUMENTS

| | | | | |
|---|---|---|---|---|
| 6,922,843 B1* | 7/2005 | Herrington | ............ | H04N 7/163 348/E7.067 |
| 8,719,921 B2* | 5/2014 | Johansson | ....................... | 726/19 |
| 2003/0009757 A1* | 1/2003 | Kikinis | ............................ | 725/39 |
| 2004/0205811 A1* | 10/2004 | Grandy | ............. | G06F 17/30867 725/28 |
| 2009/0100477 A1* | 4/2009 | Jeffs | ................................ | 725/86 |
| 2009/0119701 A1* | 5/2009 | Aldrey | ..................... | H04N 5/76 725/32 |
| 2009/0265747 A1* | 10/2009 | Li | ........................... | G06F 21/10 725/109 |
| 2011/0219397 A1* | 9/2011 | Drope | ............... | G06F 17/30017 725/31 |
| 2013/0144727 A1* | 6/2013 | Morot-Gaudry | ....... | G06Q 30/02 705/14.72 |
| 2013/0347025 A1* | 12/2013 | Prakash et al. | .................. | 725/25 |
| 2014/0068678 A1* | 3/2014 | Rodrigues et al. | .............. | 725/48 |
| 2014/0237493 A1* | 8/2014 | Russo et al. | ....................... | 725/5 |
| 2014/0282807 A1* | 9/2014 | Joseph et al. | ................. | 725/132 |
| 2014/0317657 A1* | 10/2014 | Stern | .................... | H04L 12/2801 725/35 |
| 2014/0325537 A1* | 10/2014 | Garg | .................. | H04N 21/2543 725/4 |
| 2014/0331252 A1* | 11/2014 | Jin et al. | .......................... | 725/29 |

* cited by examiner

*Primary Examiner* — Mushfikh Alam

(57) ABSTRACT

A network device receives a unique device identifier (UDID) associated with a mobile device belonging to a user, and content channel subscription information associated with the user, and stores the UDID and the content channel subscription information in a database. The network device receives the UDID and a channel identifier (ID) from a content application executing at the mobile device, and accesses the database with the UDID and the channel ID to verify the user's subscription to a content channel identified by the channel ID. The network device sends, if the user's subscription to the content channel is verified, a channel permission and a timestamp, to the mobile device, such that the mobile device is able to access content at a content provider corresponding to the channel ID prior to an expiration time that is based on the timestamp.

16 Claims, 12 Drawing Sheets

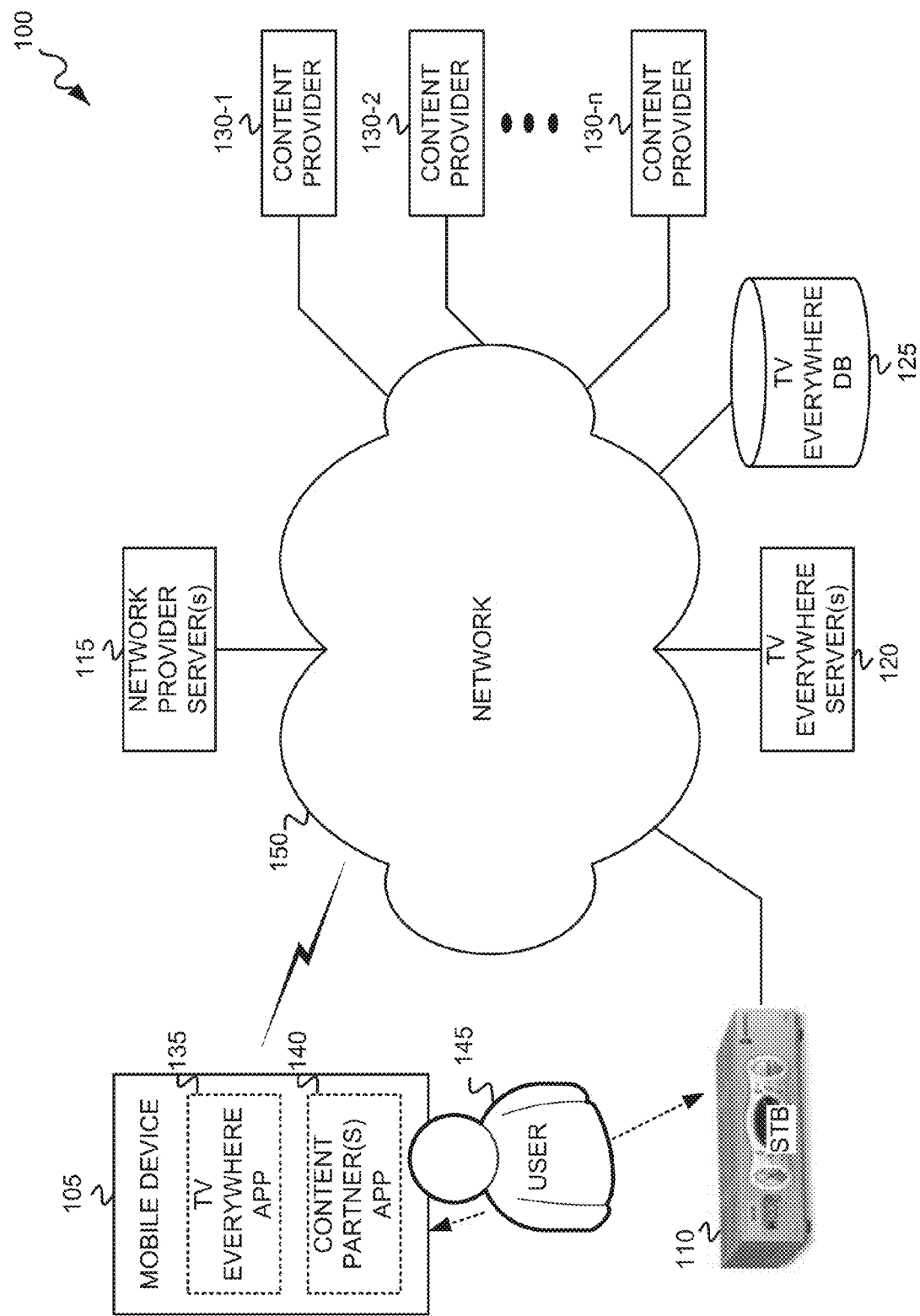

US 9,264,774 B2

SEAMLESS MULTI-CHANNEL TV EVERYWHERE SIGN-IN

BACKGROUND

Cable television networks include systems for distributing television programs via radio frequency signals transmitted through coaxial cables and/or optical signals via fiber optic cables to, for example, customer endpoints. At the customer endpoint, a television, or a set-top box connected to a television, may connect to the cable television network and may convert the transmitted radio frequency signals into audio and visual data for presentation to the customer. Television content may be provided, by content providers, to the cable television network service provider which transmits the content (e.g., television (TV) content) to the customer endpoints via the coaxial and/or fiber optic cables of the network.

BRIEF DESCRIPTION OF THE DRAWINGS

FIGS. 1A and 1B illustrate an exemplary network environment in which a mobile device user may access content, such as TV content, using a single sign-in and via multiple different content providers;

DETAILED DESCRIPTION OF THE PREFERRED EMBODIMENTS

Figure 1B:
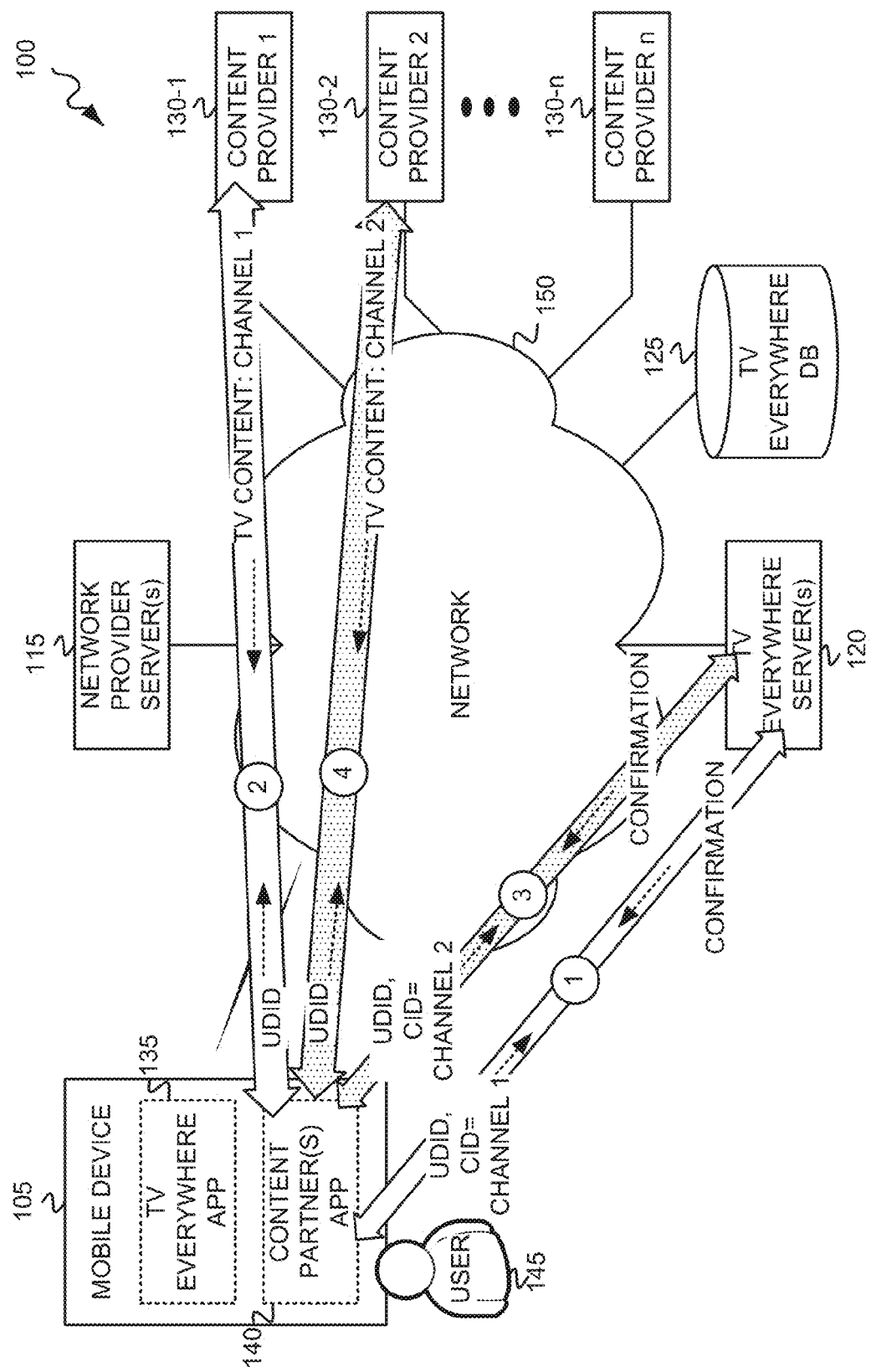

The following detailed description refers to the accompanying drawings. The same reference numbers in different drawings may identify the same or similar elements. The following detailed description does not limit the invention.

Exemplary embodiments described herein enable a mobile device user to use a "TV everywhere" service, implemented by the user's network service provider, to provide television content to one or more mobile devices used by the user, and not just to the user's home or business. A "TV everywhere" service, in addition to providing TV content to a user's home or business via, for example, a cable network, may additionally provide the television content to one or more mobile devices associated with the user at any location that has wireless or wired mobile network access (e.g., Internet access). The "TV everywhere" service, therefore, permits users to obtain programming content (e.g., TV content) for various content channels via devices that are different than the set-top box through which the user normally receives programming content. The user, as a subscriber to an existing network service (e.g., a subscriber to Verizon's Fiber Optic Service (FiOS)) may elect a certain number of content channels (e.g., HBO, BBC, History Channel) for inclusion in the user's TV everywhere service subscription, and the network service provider may store a record of the user's subscribed channels. The content channels may be provided by content providers that may be independent of the network service provider. For example, subscribers to Verizon's Fiber Optic Service (FiOS) may, as part of a "TV everywhere" service offered by Verizon, elect to subscribe to certain independent content channels that Verizon may, or may not, offer via their FiOS network. In some embodiments, a certain set of content channels may be included as a standard set of channels in the "TV everywhere" service for every user who is a subscriber to the network service of the network service provider. In other embodiments, the user may elect to subscribe to a certain set of content channels (e.g., requiring additional subscription payment, or just requiring an active selection by the user) to be included as the set of accessible channels via the "TV everywhere" service.

As described herein, content from the various content channels that are accessible to the user who subscribes to the "TV everywhere" service, may be seamlessly provided to that user at the user's mobile device based on a unique device identifier associated with the user's mobile device. A server may maintain a "TV everywhere" database that stores unique device identifiers associated with one or more mobile devices used by a given user (or multiple other users), timestamp information associated with the user's "TV everywhere" channel subscriptions, and content channels that the user has elected as part of the user's "TV everywhere" subscriptions. When the user, at the user's mobile device, executes a content application to access "TV everywhere" content associated with a specific content channel, the server consults the "TV everywhere" database to confirm the user's content channel subscriptions, and thereby enables the mobile device to communicate with the content provider that hosts the channel content. Use of a unique device identifier for the user's mobile device permits confirmation of the user's content channel subscriptions when using the "TV everywhere" service in a manner that preserves the user's anonymity.

FIGS. 1A and 1B illustrate an exemplary network environment 100 in which a mobile device user 145 may be permitted access to content at multiple different content providers, such as TV content, using a single user sign-in at the mobile device. Network environment 100 may include a mobile device 105, a set-top box (STB) 110, a network provider server(s) 115, a TV everywhere server(s) 120, a TV everywhere database (DB) 125, content providers 130-1 through 130-*n*, and network 150 (generically and individually referred to herein as "content provider 130" and collectively referred to herein as "content providers 130").

Mobile device 105 may include any type of mobile electronic device that may play media (e.g., audio and/or video media) and that may connect with network 150 via a wired or wireless connection. Mobile device 105 may include, for example, a cellular telephone (e.g., a smart phone), a personal digital assistant (PDA), a vehicular communication system, or a computer (e.g., tablet, desktop, palmtop, or laptop). STB 110 may include a device that delivers media via a network for viewing at a television (not shown). As shown, a user 145 may be associated with mobile device 105 and STB 110. User 145 may be a subscriber to a network service, such as a cable network service, that additionally has a subscription to a "TV everywhere" service that permits user 145 to access channel content, such as television content, from mobile device 105 (or one or more other mobile devices), instead of via a television (not shown) connected to STB 110.

Network provider server(s) 115 may include one or more network devices that are associated with the provision of a network service to user 145. For example, network provider server(s) 115 may include one or more network devices associated with providing a cable network service to user 145. In one embodiment, network provider server(s) 115 may include a network administration server that maintains customer records regarding subscriptions to network services, such as, for example, a "TV everywhere" service.

TV everywhere server(s) 120 may include one or more network devices that stores and maintains data in TV everywhere database (DB) 125. The data in DB 125 may include data related to confirming a given network service user's subscriptions to content channels that may provide content to the user at mobile device 105. TV everywhere DB 125 may include a network device that stores a data structure having data fields that further store device and subscriber information, such as a unique device identifier associated with a subscriber, and content channel subscription information.

Content providers 130-1 through 130-n may each include one or more network devices that store content associated with one or more content channels, and provide that content to mobile device 105 (e.g., on demand) or to STB 110. For example, content provider 130-1 may send content to STB 110 when user 145 tunes to a specific channel on STB 110 (e.g., History Channel). As another example, content provider 130-1 may send content to mobile device 105 based on a content request originating from content partner(s) app 140.

Network 150 may include one or more networks including, for example, a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., Public Switched Telephone Networks (PSTNs)), a local area network (LAN), a wide area network (WAN), a metropolitan area network (MAN), an intranet, the Internet, or a cable network (e.g., an optical cable network). Network 150 may include a content delivery network (CDN) used to deliver content (e.g., media) from content providers 130-1 through 130-n to mobile device 105 or STB 110.

Content delivery networks (CDNs) include interconnected systems of servers that can rapidly and cost effectively deliver a variety of digital content to numerous end points, such as web browsers, mobile devices, set-top boxes and gaming consoles, via, for example, the Internet. CDNs include large distributed systems of servers located in multiple data centers in the Internet. CDN nodes are typically deployed in multiple different locations, often across multiple different backbones. The number of nodes and servers of a CDN varies, depending on the CDN's architecture. CDNs serve various forms of content, including text, graphics, Uniform Resource Locators (URLs), scripts, media files, software, documents, applications, social networks, and streaming media.

For serving content via streaming media, CDNs may, for example, use Hypertext Transfer Protocol (HTTP) Live Streaming (HLS). HLS is a HTTP-based media streaming communications protocol that involves breaking the media stream into a sequence of file downloads. Each file may be downloaded as one portion of a transport stream. Each downloaded file may be played in sequence to present a continuous media stream.

The configuration of network components of network environment 100 illustrated in FIG. 1A is for illustrative purposes. Other configurations may be implemented. Therefore, network environment 100 may include additional, fewer and/or different components that may be configured in a different arrangement than those depicted in FIG. 1A. For example, though only a single mobile device 105, STB 110, and user 145 are shown in FIG. 1A, network environment 100 may multiple different mobile devices 105, STBs 110, and users 145.

FIG. 1B depicts exemplary delivery of channel content from specific content providers to mobile device 105. Subsequent to network provider server(s) 115 registering with TV everywhere server(s) 120 on behalf of user 145 (described below with respect to the exemplary process of FIG. 4), content partner(s) app 140 at mobile device 105 may send a unique device identifier (UDID) and channel ID (identified with a "1" within a circle in FIG. 1B) to TV everywhere server(s) 120 to receive confirmation of user 145's subscription to the channel identified by the channel ID (CID). Upon receipt of the channel subscription confirmation from TV everywhere server(s) 120, content partner(s) app 140 at mobile device 105 sends a request (identified with a "2" within a circle), that includes the UDID, to content provider 1 130-1 that stores content associated with the channel identified by the CID (e.g., Channel 1), and receives the requested TV content for the requested content channel. Mobile device 105 may, via a media player (not shown), play the requested TV content (e.g., download a media file and play, or receive streaming media content and play).

In another instance, content partner(s) app 140 at mobile device 105 may send the UDID and another channel ID (identified with a "3" within a circle in FIG. 1B) to TV everywhere server(s) 120 to receive confirmation of user 145's subscription to the other channel identified by the channel ID (CID). Upon receipt of the channel subscription confirmation from TV everywhere server(s) 120, content partner(s) app 140 at mobile device 105 sends a request (identified with a "4" within a circle), that includes the UDID, to content provider 1 130-1 that stores content associated with the channel identified by the CID (e.g., channel 2), and receives the requested TV content for the requested content channel. Mobile device 105 may, via a media player (not shown), play the delivered TV content.

Figure 2:
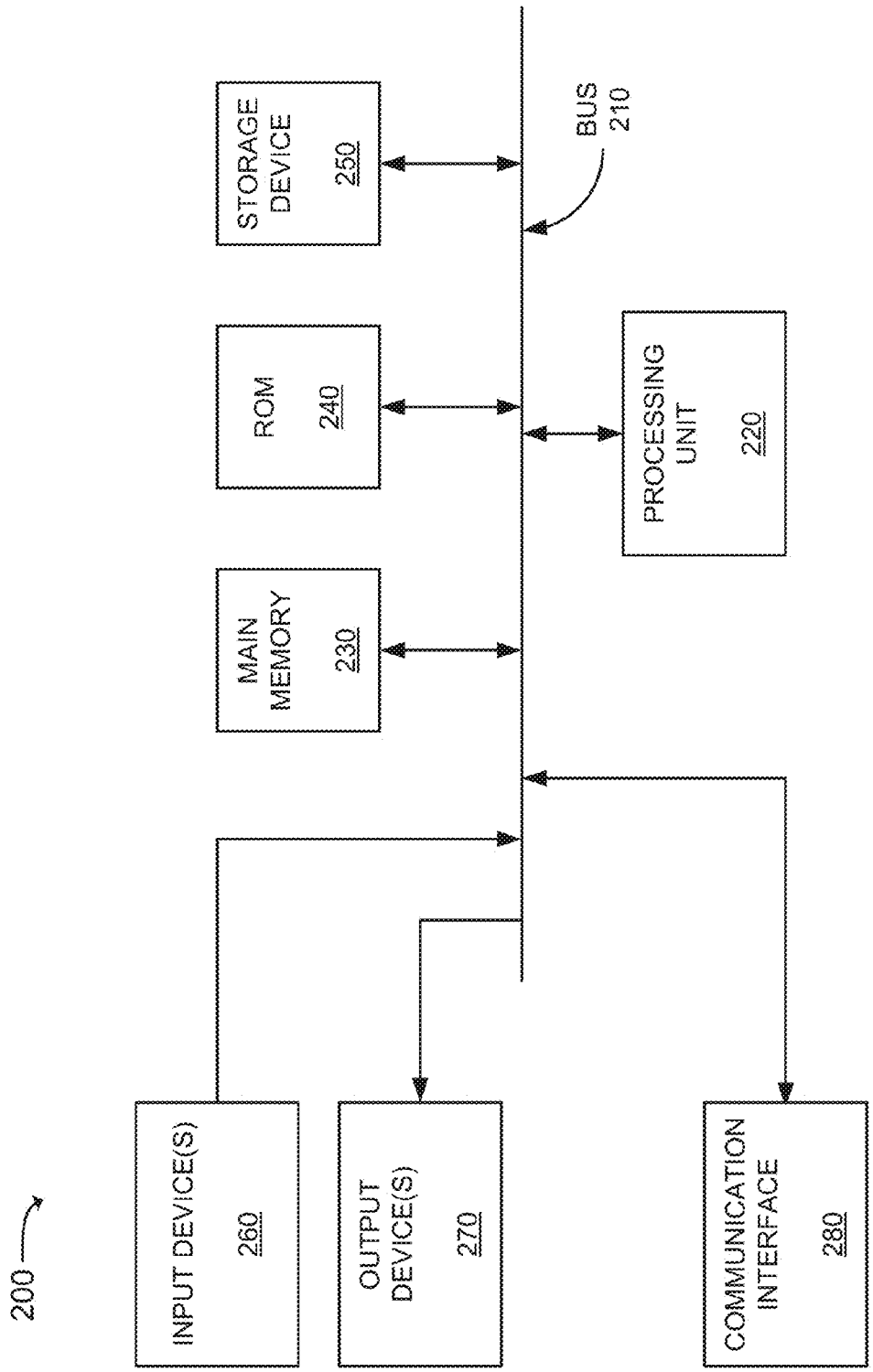
FIG. 2 is a diagram that depicts exemplary components of a device described herein.

FIG. 2 is a diagram that depicts exemplary components of a device 200. Mobile device 105, network provider server(s) 115, content providers 130, TV everywhere server(s) 120 and TV everywhere DB 125 may each be configured identical to, or similar to, device 200.

Device 200 may include a bus 210, a processing unit 220, a main memory 230, a read only memory (ROM) 240, a storage device 250, an input device 260, an output device 270, and a communication interface 280. Bus 210 may include a path that permits communication among the components of device 200.

Processing unit 220 may include one or more processors or microprocessors, or processing logic, which may interpret and execute instructions. Main memory 230 may include a random access memory (RAM) or another type of dynamic storage device that may store information and instructions for execution by processing unit 220. ROM 240 may include a ROM device or another type of static storage device that may store static information and instructions for use by processing unit 220. Storage device 250 may include a magnetic and/or optical recording medium. Main memory 230, ROM 240 and storage device 250 may each be referred to herein as a "tangible, non-transitory computer-readable medium." The processes/methods described herein can be implemented as instructions that are stored in main memory 230, ROM 240 and/or storage device 250 for execution by processing unit 220.

Input device 260 may include one or more mechanisms that permit a user to input information to device 200, such as, for example, a keypad or a keyboard, a display with a touch sensitive panel, voice recognition and/or biometric mechanisms, etc. Output device 270 may include one or more mechanisms that output information to the operator, including a display, a speaker, etc. Input device 260 and output device 270 may, in some implementations, be implemented as a user interface (UI) that displays UI information and which receives user input via the UI. Communication interface(s) 480 may include a transceiver that enables device 200 to communicate with other devices and/or systems. For example, communication interface(s) 280 may include wired or wireless transceivers for communicating via network 150.

The configuration of components of device 200 illustrated in FIG. 2 is for illustrative purposes. Other configurations may be implemented. Therefore, device 200 may include additional, fewer and/or different components than those depicted in FIG. 2.

Figure 3:
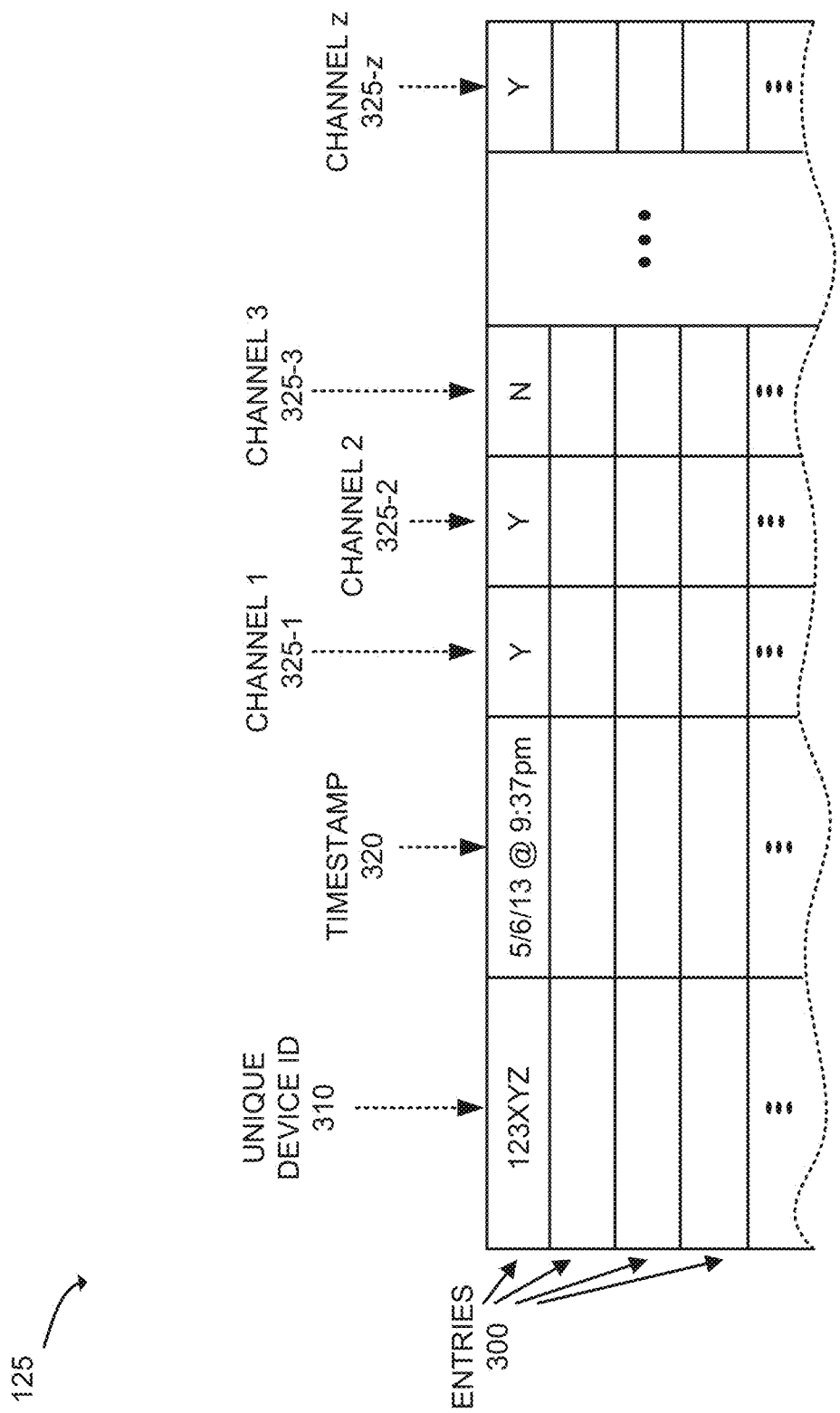
FIG. 3 is a diagram that depicts a TV everywhere database of FIGS. 1A and 1B.

FIG. 3 is a diagram that depicts an exemplary data structure associated with TV everywhere DB 125. TV everywhere DB 125 may include multiple entries 300, each of which may include a unique device identifier (UDID) field 310, a timestamp field 320, and channel fields 325-1 through 325-z.

Unique device ID field 310 may store a unique identifier of a mobile device 105 associated with user 145. Timestamp field 320 may store a time (e.g., date and time) at which user 145's device and content channel subscriptions are registered with TV everywhere server(s) 120. Channel field 325-1 through 325-z may each include a unique code that identifies a content channel, and a flag that identifies whether or not (e.g., Y=1, N=0) user 145, associated with mobile device 105, subscribes to the given content channel.

The number and content of the fields of each entry 300 of TV everywhere DB 125 is for illustrative purposes. Each entry 300 of TV everywhere DB 125 may include additional, fewer and/or different fields than those depicted in FIG. 3. For example, a given user 145 may be associated (e.g., may own, rent or use) with multiple different mobile devices 105 (e.g., smart phone, desktop computer, and tablet computer), and each mobile device 105 may have an entry 300 in DB 125. TV everywhere DB 125 is depicted in FIG. 3 as a tabulated data structure for purposes of illustration. Other types of data structures (e.g., linked lists, etc.), not shown, may also be used for associating data fields 310, 320, and 325-1 through 325-z within DB 125.

Figure 4:
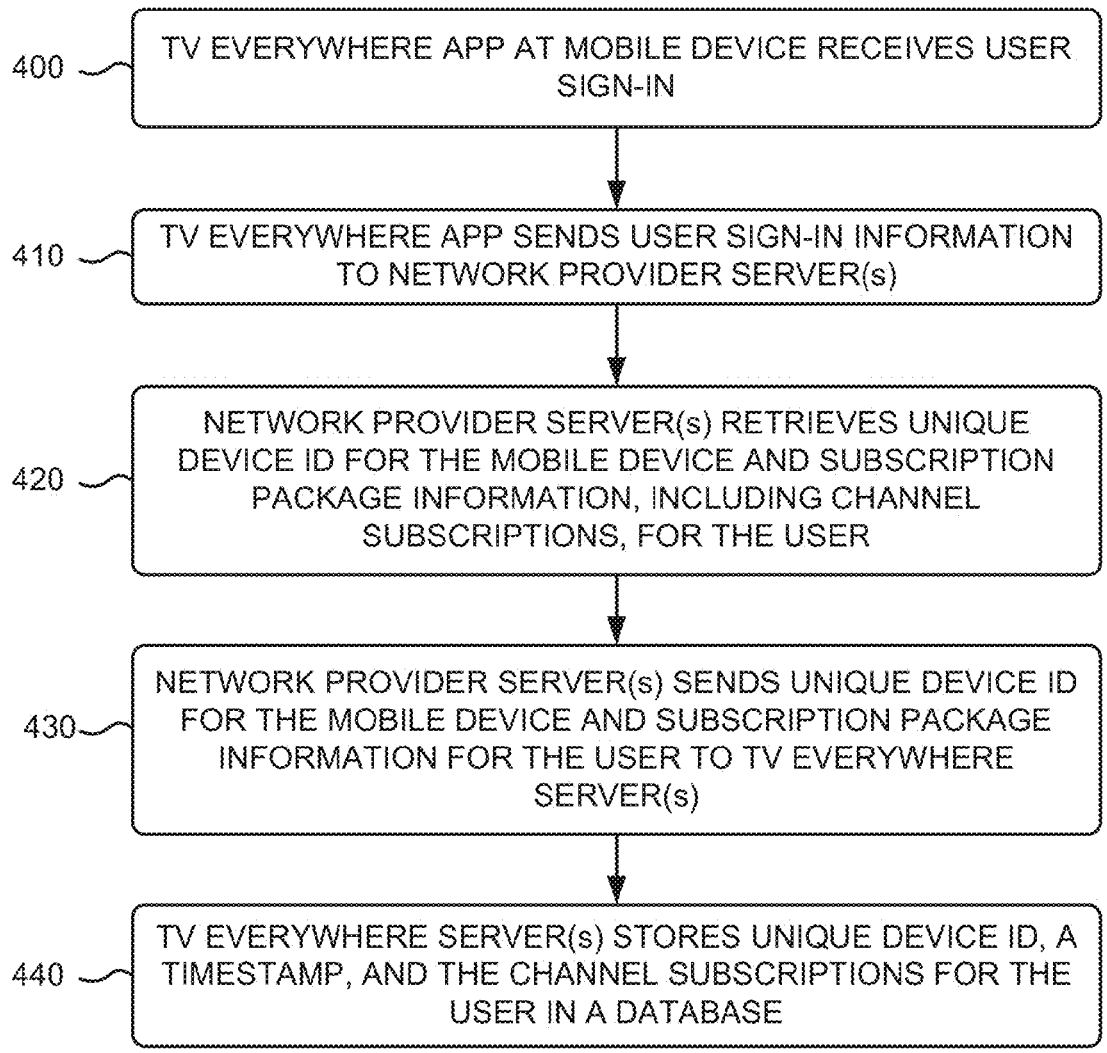
FIG. 4 is a flow diagram of an exemplary process for user sign-in and registration with a network service provider's TV everywhere service to enable the user to seamlessly access content from multiple different content providers via the single sign-in and registration.

FIG. 4 is a flow diagram of an exemplary process for user sign-in and registration with a network service provider's TV everywhere service to enable the user to seamlessly access content from multiple different content providers via the single sign-in and registration. The exemplary process of FIG. 4 may be implemented by mobile device 105, in conjunction with network provider server(s) 115 and TV everywhere server(s) 120. The exemplary process of FIG. 4 is described below with reference to the diagrams of FIGS. 5 and 6.

Figure 5:
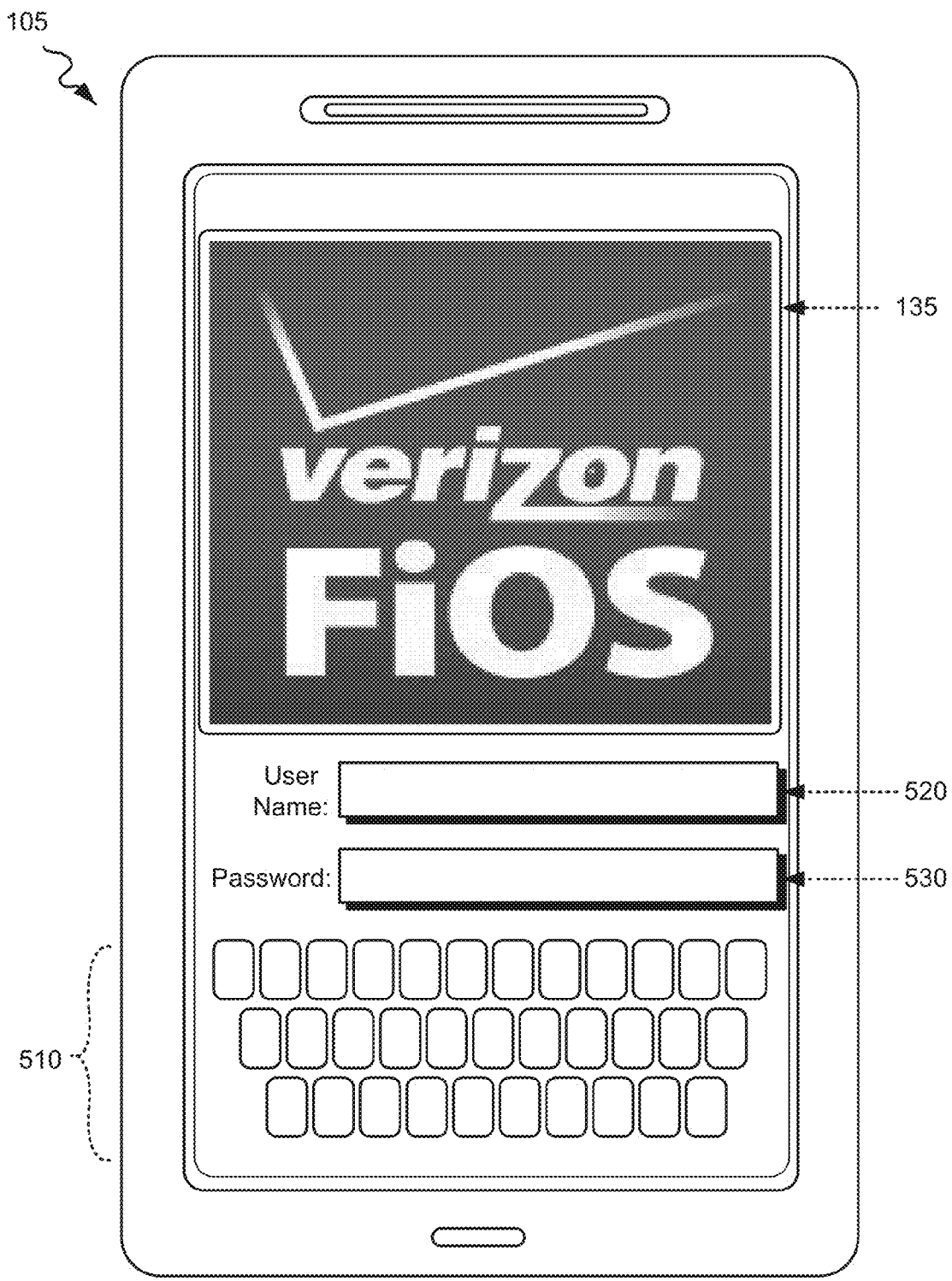
FIG. 5 is a diagram that depicts an example of a user interface at a mobile device for signing in to a network service provider's TV everywhere service.

The exemplary process may include TV everywhere app 135 at mobile device 105 receiving a sign-in from user 145 (block 400). FIG. 5 depicts an example of user sign-in to TV everywhere app 135 executing on mobile device 105. As shown in FIG. 5, user 145 (not shown) may use, for example, a virtual keyboard 510 to enter a user name 520 and a password 530 to sign-in to TV everywhere app 135. The messaging diagram of FIG. 6 further graphically depicts user 145 signing in to TV everywhere app 135 at mobile device 105.

Figure 6:
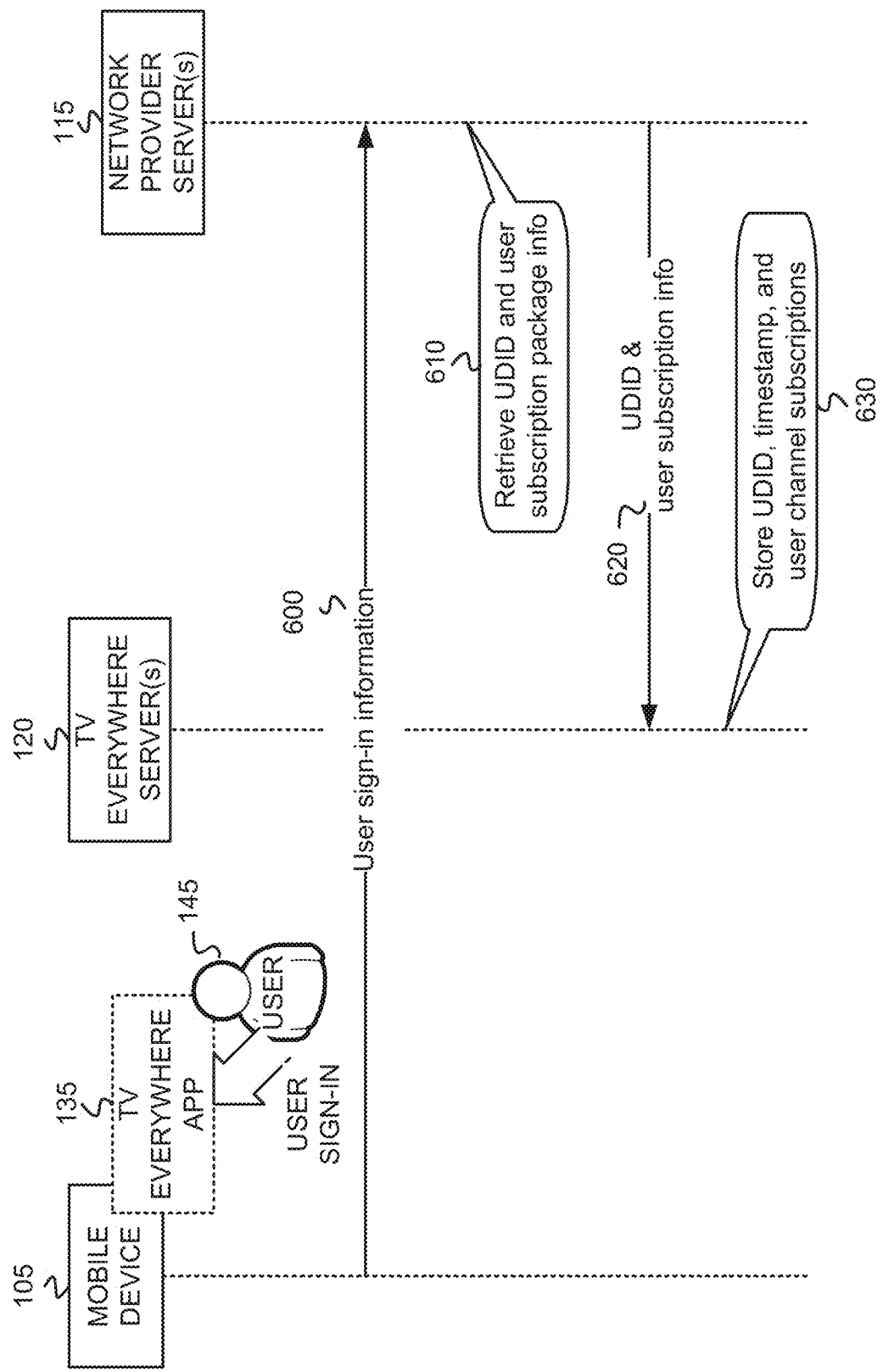
FIG. 6 is a messaging diagram associated with the exemplary process of FIG. 4.

TV everywhere app 135 at mobile device 105 sends the user's sign-in information to network provider server(s) 115 (block 410). As depicted in FIG. 6, TV everywhere app 135 at mobile device 105 sends a message 600 that includes user 145's sign-in information. Message 600 may further include data that may, for example, identify mobile device 105. The data may, for example, include some sort of identifier that identifies a type of mobile device 105 (e.g., a tablet computer, a smart phone, etc.) and which network provider server(s) 115 may use to associate a unique device identifier with mobile device 105.

Network provider server(s) 115, upon receipt of user 145's sign-in information, may retrieve the UDID for mobile device 105 and subscription package information, including channel subscriptions, for the user (block 420) and may send the UDID for mobile device 105 and the user's subscription package information to TV everywhere server(s) 120 (block 430). Network provider server(s) 115 may maintain a database (not shown) that stores various data associated with user 145, and user 145's subscription to network services provided by a network provider that operates network provider server(s) 115. For example, Verizon, as a network service provider, may maintain a database that stores all relevant data associated with user 145 and user 145's subscription to one or more network services provided by Verizon. The user's subscription package information may include data that identifies the set of content channels to which user 145 subscribes, either as a component of another service (e.g., FiOS service), or as an "add-on" to an existing service (e.g., the user elects to subscribe to a set of content channels for TV everywhere access). Network provider server(s) 115 may store a UDID for each mobile device 105 that user 145 uses. FIG. 6 depicts network provider server(s) 115 retrieving 610 a UDID associated with mobile device 105, and subscription package information associated with user 145. FIG. 6 further depicts network provider server(s) 115 sending a message 620 that includes the retrieved UDID and user subscription information to TV everywhere server(s) 120.

TV everywhere server(s) 120 may store the UDID, a timestamp, and channel subscriptions for the user in DB 125 (block 440). At the time TV everywhere server(s) 120 receives the UDID and user subscription information, TV everywhere server(s) 120 may obtain a current time as a timestamp. The timestamp may subsequently be used to determine an expiration time at which the user's access to content at a content channel expires. Referring to FIG. 3, TV everywhere server(s) 120 may store the UDID in device ID field 310 of DB 125, the timestamp in timestamp field 320, and appropriate components of the user subscription information in fields 325-1 through 325-z. For example, if the user subscription information indicates that user 145 subscribes to channels 1, 2 and z, then channel 1 field 325-1 may indicate a "Y," channel 2 field 325-2 may indicate a "Y," channel 3 field 325-3 may indicate a "N," and channel z field 325-z may indicate a "Y."

The exemplary process of FIG. 4 may be repeated for each instance of user 145 signing in to TV everywhere app 135 at mobile device 105. In circumstances where user 145 uses multiple different mobile devices 105, the exemplary process of FIG. 4 may be repeated each time user 145 signs into a TV everywhere app 135 executed by a given one of the multiple mobile devices 105.

Figure 7:
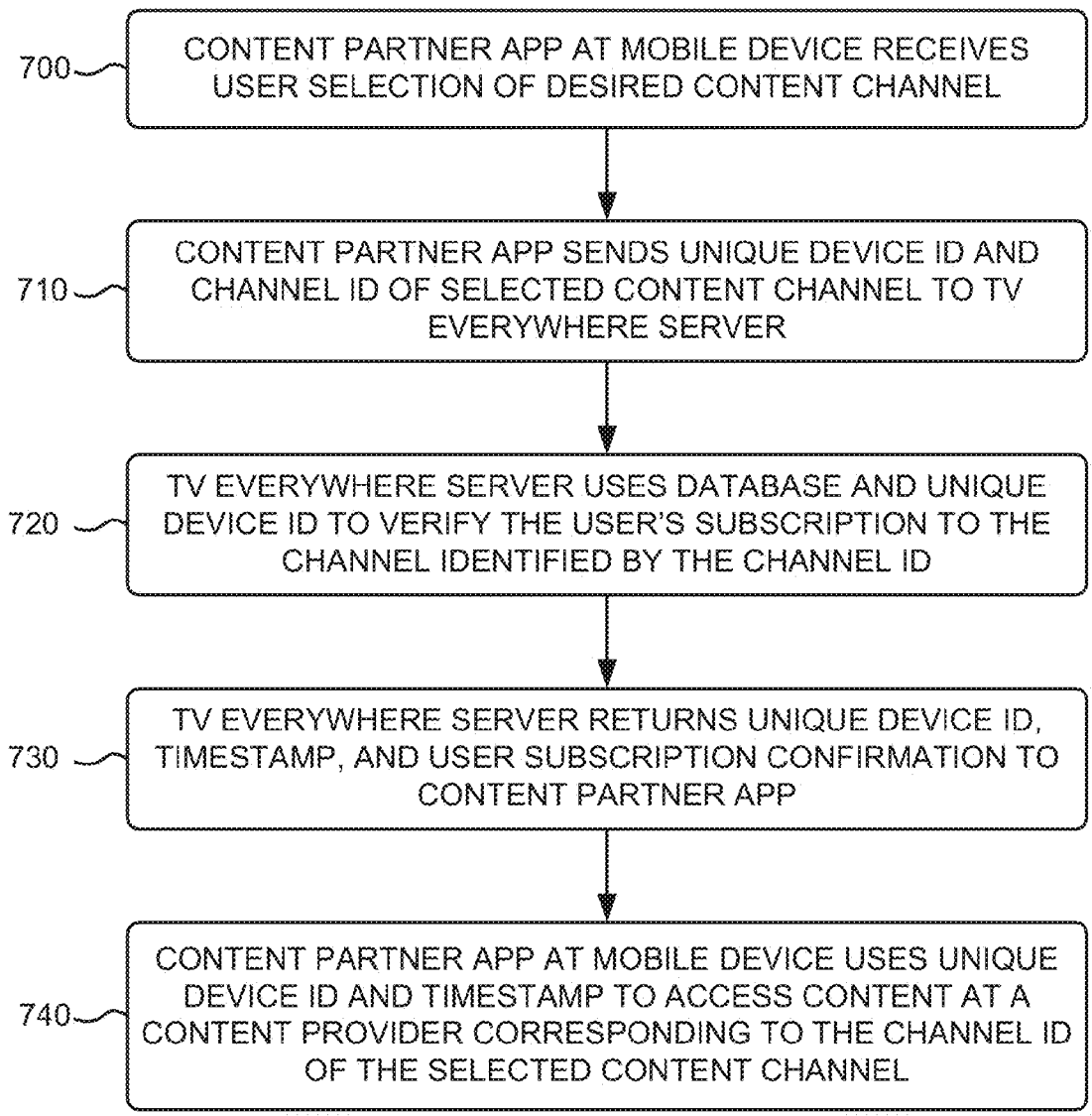
FIG. 7 is a flow diagram of an exemplary process for obtaining, by an application at a mobile device, user subscription confirmation of content provided by a specific content provider such that the mobile device may request and access content from the content provider.

FIG. 7 is a flow diagram of an exemplary process for obtaining, by an application at a mobile device, user subscription confirmation of content provided by a specific content provider such that the mobile device may request and access content from the content provider. The exemplary process of FIG. 7 may be implemented by mobile device 105, in conjunction with TV everywhere server(s) 120 and content provider 130. The exemplary process of FIG. 7 is described below with reference to the diagrams of FIGS. 8-11.

Figure 8:
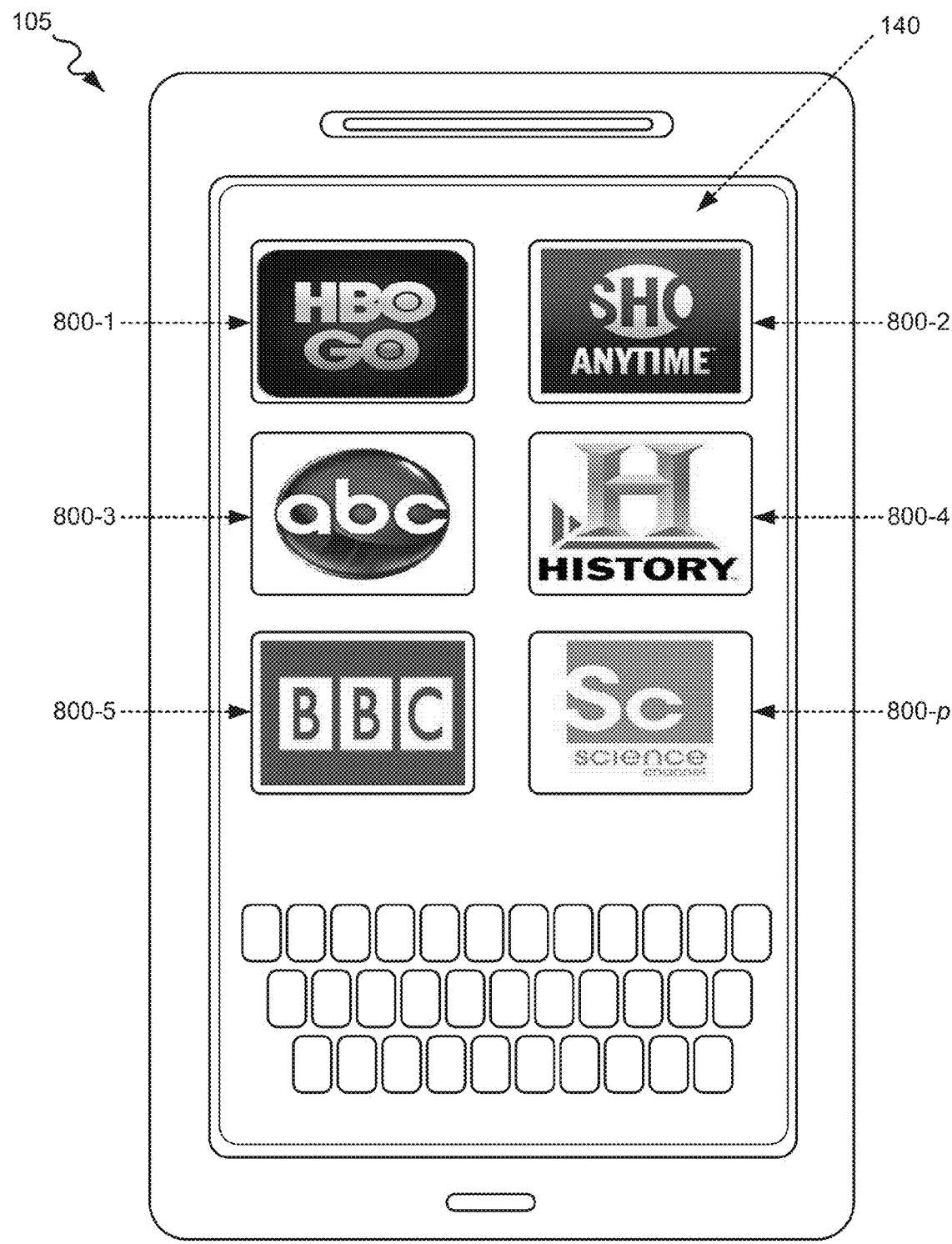
FIG. 8 is a diagram that depicts an example of a user interface at a mobile device for receiving a user's selection of a desired content channel associated with a network service provider's TV everywhere service.
Figure 9:
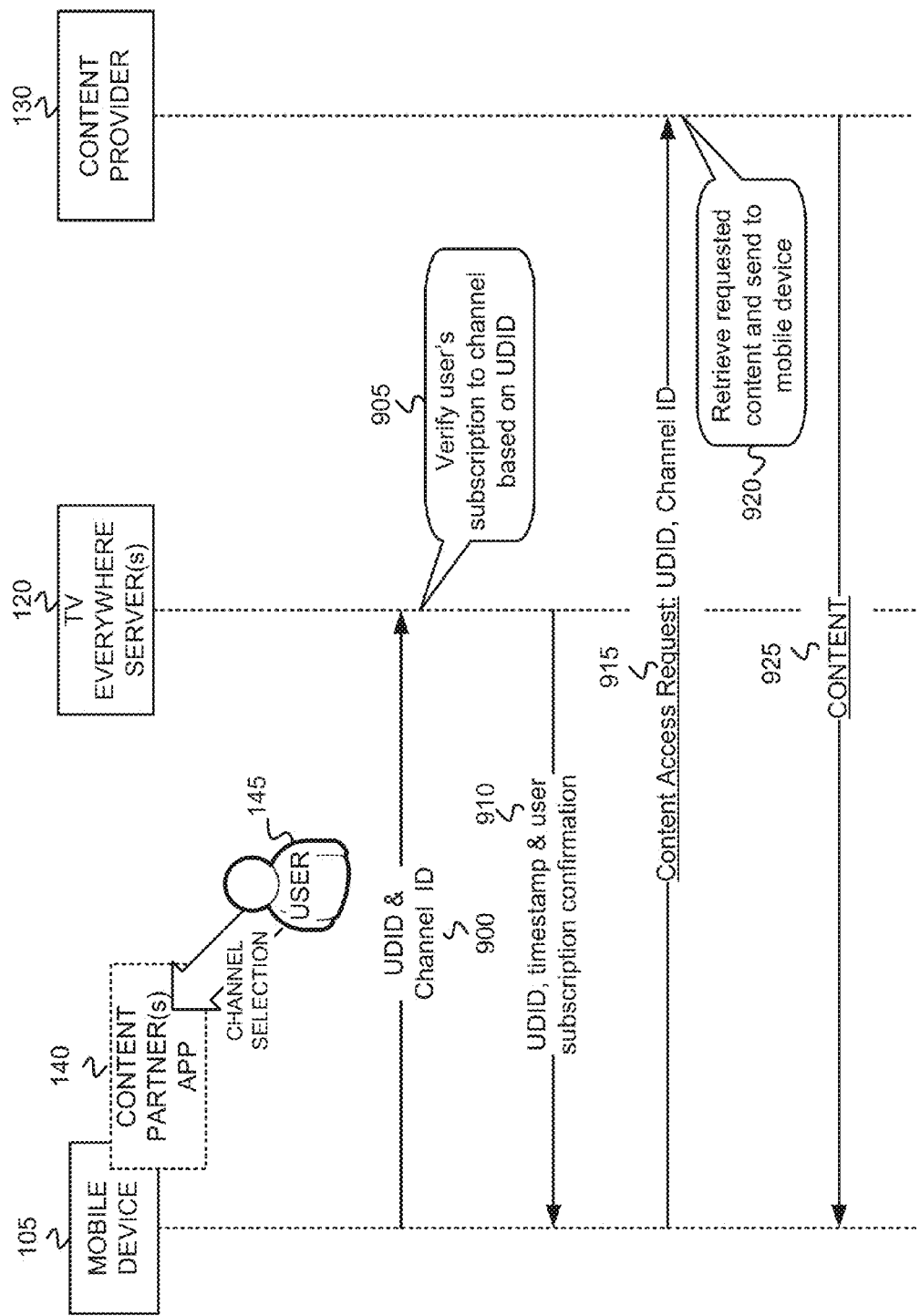
FIG. 9 is a messaging diagram associated with the exemplary process of FIG. 7.

The exemplary process may include content partner(s) app 140 at mobile device 105 receiving user selection of a desired content channel (block 710). For example, as shown in FIG. 8, user 145 (not shown) may select a desired content channel 800-1 through 800-p from content partner(s) app 140 being executed at mobile device 105. FIG. 9 further depicts user 145 selecting a content channel via content partner(s) app 140.

Content partner app 140 at mobile device 105 may send a unique device ID and channel ID of the selected content channel to TV everywhere server 120 (block 710). FIG. 9 shows content partner(s) app 140 at mobile device 105 sending a message 900 that includes mobile device 105's UDID, and an ID of the content channel (e.g., an identifier that identifies "The History Channel") selected by user 145. Upon receipt of the unique device ID and channel ID from content partner app 140, TV everywhere server 120 may use DB 125 and the received unique device ID to verify the user's subscription to the channel identified by the channel ID (block 720). For example, TV everywhere server(s) 120 may index DB 125 to locate an entry 300 having a device ID field 310 that matches the UDID received from mobile device 105. Upon locating the matching entry 300, TV everywhere server(s) 120 may locate the channel field 325 that matches the channel ID received from mobile device 105 (e.g., channel ID=channel code for "The History Channel" matched with channel field 325 having a same channel code), and confirm whether or not user 145 subscribes to that content channel (e.g., channel field 325 includes data indicating a "yes" for the user's subscription to that particular content channel). Additionally, TV everywhere server(s) 120 may retrieve the timestamp from timestamp field 320 from the matching entry 300 of DB 125. FIG. 9 depicts TV everywhere server(s) 120 verifying user 145's subscription to the selected channel based on mobile device 105's UDID. TV everywhere server 120 may return the unique device ID, a timestamp and the user subscription confirmation retrieved from DB 125 to content partner app 140 (block 730). FIG. 9 depicts TV everywhere server(s) 120 sending a message 910 that includes the UDID, the timestamp, and the user subscription information retrieved from DB 125.

Figure 10:
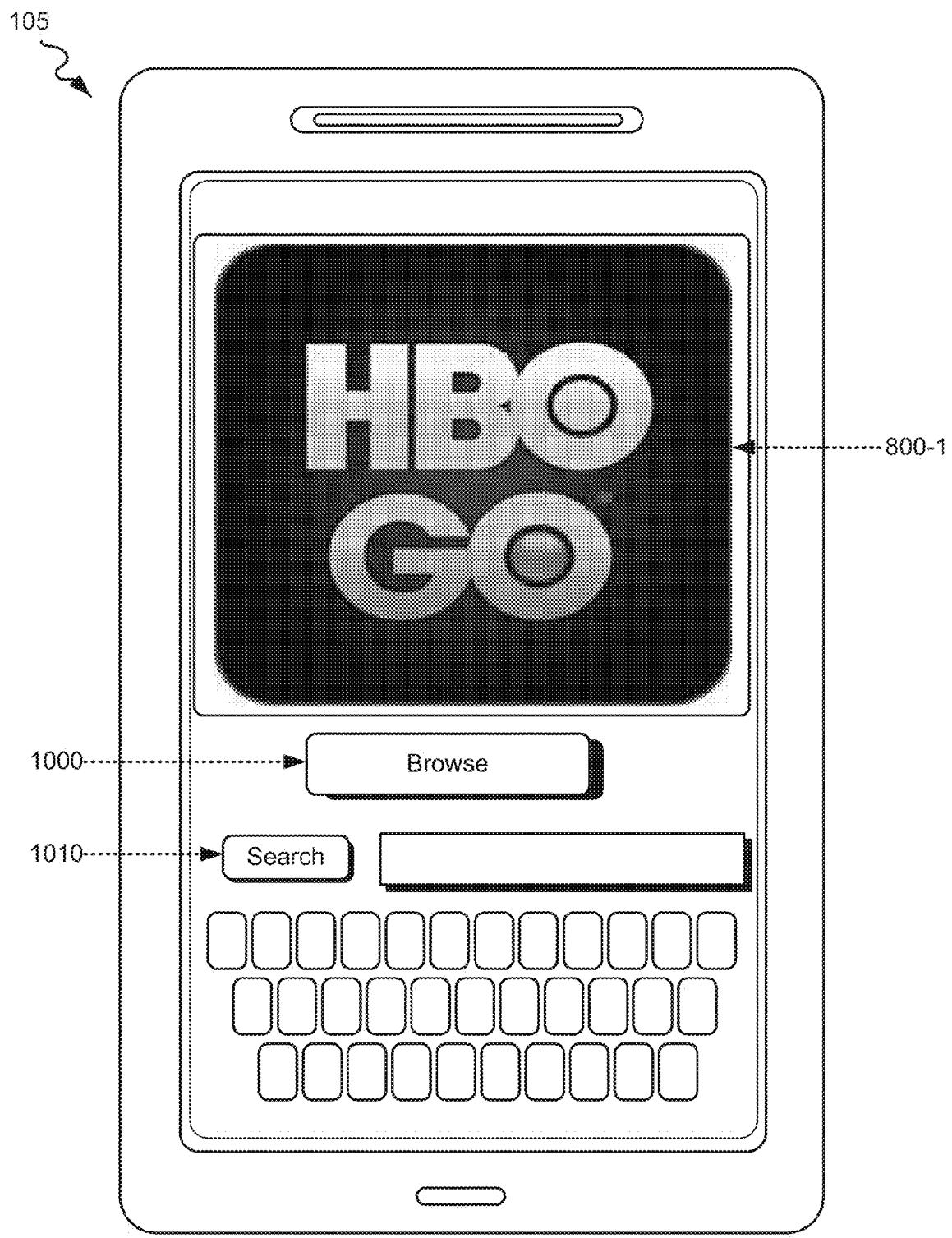
FIG. 10 is a diagram that depicts an exemplary user interface at a mobile device for browsing or searching content associated with a specific content channel.
Figure 11:
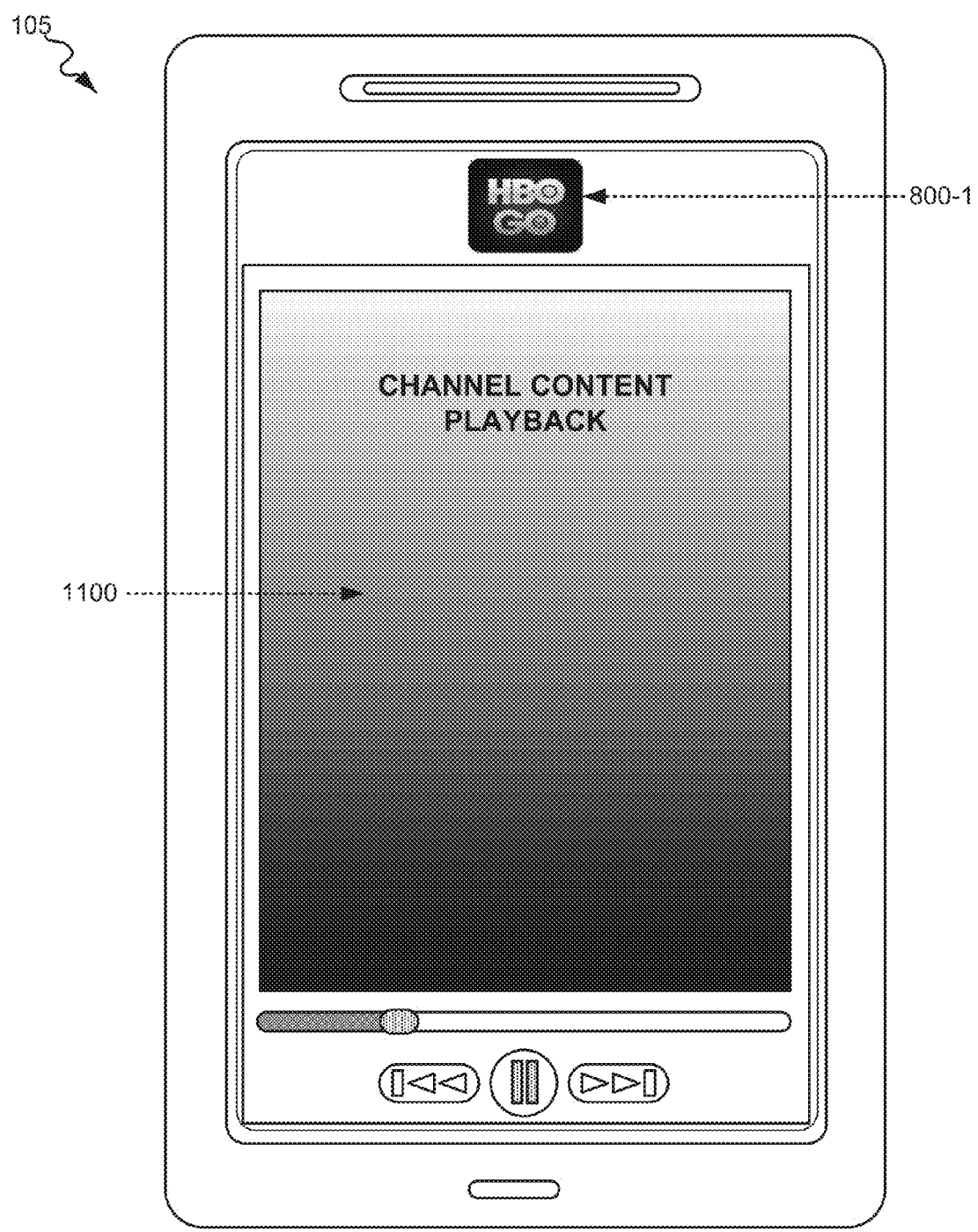
FIG. 11 is a diagram that depicts an exemplary player at a mobile device that plays or displays content received from a content provider associated with a specific content channel.

Content partner app 140 at mobile device 105 uses the unique device ID and the received timestamp to access content at a content provider corresponding to the channel ID of the selected content channel (block 740). Content partner(s) app 140 may determine a channel expiration time for user 145 based on the timestamp received from TV everywhere server(s) 120. The channel expiration time may involve a global expiration for all channels (e.g., 24 hours, 1 week) or may be channel-specific (e.g., HBO has a channel expiration time of 24 hours, whereas BBC has a channel expiration time of 3 days). FIG. 9 depicts content partner(s) app 140 at mobile device 105 sending a content access request message 915 to content provider 130 that includes mobile device 105's UDID and the channel ID of the channel from which content is being requested. Upon receipt of message 915, content provider 130 may retrieve 920 the requested content and send the requested content 925 to mobile device 105. For example, content provider 130 may stream the requested content to mobile device 105 using HLS. In one implementation, user 145 may browse and/or search content stored at content provider 130 for a selected content channel. For example, upon selection of the "HBO" content channel 800-1 in FIG. 8, user 145 may, as shown in FIG. 10, browse 1000 or search 1010 content, stored at content provider 130 for the selected content channel, via content partner(s) app 140 and a user interface of mobile device 105. The browsing may include navigating through a hierarchical index of channel content stored at content provider 130. Searching may include using, for example, a keyword text search to identify relevant content stored at content provider 130. Channel content selected via the browsing or searching by user 145 may be received from content provider 130 and played back 1100 at mobile device 105, as depicted in FIG. 11. In the example of FIG. 11, the channel content may include audio-only media content, or video media content (i.e., audio and video).

The exemplary process of FIG. 7 may be selectively repeated for each selection of a desired content channel by user 145 via a content partner(s) app 140 being executed at mobile device 105. For example, user 145 may select, via the exemplary process of FIG. 7, a first content channel, and may view content from the first content channel at mobile device 105. Subsequently, user 145 may select, via the exemplary process of FIG. 7, a second, different content channel, and may view content from the second content channel at mobile device 105.

Exemplary embodiments described herein seamlessly provide a "TV everywhere" service to a user's mobile device(s) based on a UDID associated with the user's mobile device. A server may, based on a UDID associated with the user's mobile device, confirm the user's content channel subscriptions to enable the user to access content channels (e.g., TV content channels) at the user's mobile device.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 4 and 7, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, at a first network device, a first set of multiple user-selected content channels selected by a first user for accessing via one or more first mobile devices, wherein the first set of multiple user-selected content channels is different than a second set of content channels subscribed to by the first user for access via a first set-top box connected to a television, and wherein each of the multiple user-selected content channels of the first set involves content deliverable by a different one of multiple content providers, wherein each of the multiple content providers is associated with a different content delivery device of multiple content delivery devices, and wherein the first network device is a different device than the multiple content delivery devices;
   receiving, at the first network device, a first unique device identifier (UDID) associated with a first mobile device, of the one or more first mobile devices, associated with the first user;
   storing, by the first network device, the first UDID in a database;
   storing, in association with the first UDID in the database, first channel subscription data that identifies each of the multiple user-selected content channels of the first set;
   receiving, at the first network device, the first UDID and a first channel identifier (ID) from a first content application executing at the first mobile device, wherein the first channel ID identifies a first content channel, deliverable by a first content provider of the multiple content providers via a first content delivery device of the multiple content delivery devices, that the first user wants to receive at the first mobile device;
   accessing, at the first network device, the database with the first UDID and the first channel ID to analyze the first channel subscription data to verify that the first content channel identified by the first channel ID is among the multiple user-selected content channels of the first set selected by the first user for accessing via the one or more first mobile devices;
   sending, if the first content channel identified by the first channel ID is among the first set of multiple user-selected content channels, a first channel permission and a first timestamp, from the first network device to the first mobile device, such that the first mobile device is able to access content at the first content provider of the multiple content providers corresponding to the first channel ID prior to a first expiration time that is based on the first timestamp;
   receiving, at the first network device, the first UDID and a second channel identifier (ID) from the first content application executing at the first mobile device, wherein the second channel ID identifies a second content channel, deliverable by a second content provider of the multiple content providers via a second content delivery device of the multiple content delivery devices, that the first user wants to receive at the first mobile device;
   accessing, at the first network device, the database with the first UDID and the second channel ID to analyze the first channel subscription data to verify that the second content channel identified by the second channel ID is among the multiple user-selected content channels of the first set; and
   sending, if the second content channel identified by the second channel ID is among the first set of multiple user-selected content channels, a second channel permission and the first timestamp, from the first network device to the first mobile device, such that the first mobile device is able to access content at the second content provider, of the multiple content providers, corresponding to the second channel ID prior to a second expiration time that is based on the first timestamp.

2. The method of claim 1, wherein the content comprises television (TV) content, wherein each of the multiple user-selected content channels of the first set comprises a different TV content channel, and wherein the first content channel comprises a TV content channel.

3. The method of claim 1, further comprising:
   receiving, at the first network device, a third set of multiple user-selected content channels selected by a second user for accessing via one or more second mobile devices, wherein the third set of multiple user-selected content channels is different than a fourth set of content channels subscribed to by the second user for access via a second set-top box connected to a second television, and wherein each of the multiple user-selected content channels of the third set involves content deliverable by a different one of the multiple content providers;
   receiving, at the first network device, a second UDID associated with a second mobile device, of the one or more second mobile devices, associated with the second user;
   storing the second UDID in the database;
   storing, in association with the second UDID in the database, second channel subscription data that identifies each of the multiple user-selected content channels of the third set;
   receiving, at the first network device, the second UDID and a third channel identifier (ID) from a second content application executing at the second mobile device, wherein the third channel ID identifies a third content channel, deliverable by a third content provider of the multiple content providers via a third content delivery device of the multiple content delivery devices, that the second user wants to receive at the second mobile device;
   accessing, at the first network device, the database with the second UDID and the third channel ID to analyze the second channel subscription data to verify that the third content channel identified by the third channel ID is among the multiple user-selected content channels of the third set; and
   sending, if the third content channel identified by the third channel ID is among the third set of multiple user-selected content channels, a third channel permission and a second timestamp, from the first network device to the second mobile device, such that the second mobile device is able to access content at the third content provider of the multiple content providers corresponding to the third channel ID prior to a third expiration date that is based on the second timestamp.

4. The method of claim 1, further comprising:
receiving, at a second network device from the user, a sign-in to a network service, wherein the second network device is different than the first network device and is associated with a provider of network services.

5. The method of claim 4, further comprising:
retrieving, at the second network device, the first UDID for the first mobile device and the first set of multiple user-selected content channels selected by the first user; and
sending, from the second network device to the first network device, the first UDID and the first set of multiple user-selected content channels selected by the first user.

6. The method of claim 5, further comprising:
obtaining, at the first network device when the first UDID and the first set of multiple user-selected content channels selected by the first user are received from the second network device, the first timestamp; and
storing, in the database, the first timestamp in association with the first UDID and the first channel subscription data.

7. The method of claim 1, wherein the first mobile device comprises a device that includes functionality for playing media and for connecting with a network via a wired or wireless connection.

8. The method of claim 7, wherein the first mobile device comprises one of a cellular telephone, a vehicular communication system, a personal digital assistant (PDA), or a tablet, desktop, palmtop, or laptop computer.

9. A first network device, comprising:
a communication interface;
a processing unit configured to:
receive, via the communication interface, a first set of multiple user-selected content channels selected by a first user for accessing via one or more first mobile devices, wherein the first set of multiple user-selected content channels is different than a second set of content channels subscribed to by the first user for access via a first set-top box connected to a television, and wherein each of the multiple user-selected content channels of the first set involves content deliverable by a different one of multiple content providers, wherein each of the multiple content providers is associated with a different content delivery device of multiple content delivery devices, and wherein the first network device is a different device than the multiple content delivery devices,
receive, via the communication interface, a first unique device identifier (UDID) associated with a first mobile device, of the one or more first mobile devices, associated with the first user,
store the first UDID in a database,
store, in association with the first UDID in the database, first channel subscription data that identifies each of the multiple user-selected content channels of the first set selected by the first user for accessing via the one or more first mobile devices,
receive the first UDID and a first channel identifier (ID) from a first content application executing at the first mobile device, wherein the first channel ID identifies a first content channel, deliverable by a first content provider of the multiple content providers via a first content delivery device of the multiple content delivery devices, that the first user wants to receive at the first mobile device,
access the database with the first UDID and the first channel ID to analyze the first channel subscription data to verify that the first content channel identified by the first channel ID is among the multiple user-selected content channels of the first set selected by the first user for accessing via the one or more first mobile devices,
send, if the first content channel identified by the first channel ID is among the first set of multiple user-selected content channels selected by the first user, a first channel permission and a first timestamp, to the first mobile device via the communication interface, such that the first mobile device is able to access content at the first content provider of the multiple content providers corresponding to the first channel ID prior to a first expiration time that is based on the first timestamp,
receive, via the communication interface, the first UDID and a second channel identifier (ID) from the first content application executing at the first mobile device, wherein the second channel ID identifies a second content channel, deliverable by a second content provider of the multiple content providers via a second content delivery device of the multiple content delivery devices, that the first user wants to receive at the first mobile device,
access the database with the first UDID and the second channel ID to analyze the first channel subscription data to verify that the second content channel identified by the second channel ID is among the multiple user-selected content channels of the first set selected by the first user for accessing via the one or more first mobile devices, and
send, if the second content channel identified by the second channel ID is among the first set of multiple user-selected content channels selected by the first user, a second channel permission and the first timestamp, to the first mobile device via the communication interface, such that the first mobile device is able to access content at the second content provider, of the multiple content providers, corresponding to the second channel ID prior to a second expiration time that is based on the first timestamp.

10. The first network device of claim 9, wherein the content comprises television (TV) content, wherein each of the multiple user-selected content channels of the first set comprises a different TV content channel, and wherein the first content channel comprises a TV content channel.

11. The first network device of claim 9, wherein the processing unit is configured to:
receive, via the communication interface, a third set of multiple user-selected content channels selected by a second user for accessing via one or more second mobile devices, wherein the third set of multiple user-selected content channels is different than a fourth set of content channels subscribed to by the second user for access via a second set-top box connected to a second television, and wherein each of the multiple user-selected content channels of the third set involves content deliverable by a different one of the multiple content providers,
receive, via the communication interface, a second UDID associated with a second mobile device, of the one or more second mobile devices, associated with the second user,
store the second UDID in the database,
receive, via the communication interface, the second UDID and a third channel identifier (ID) from a second content application executing at the second mobile device, wherein the third channel ID identifies a third content channel, deliverable by a third content provider of the multiple content providers via a third content delivery device of the multiple content delivery devices, that the second user wants to receive at the second mobile device, access the database with the second UDID and the third channel ID to analyze the third channel subscription data to verify that the third content channel identified by the third channel ID is among the multiple user-selected content channels of the third set selected by the second user for accessing via the one or more second mobile devices; and send, if the third content channel identified by the third channel ID is among the third set of multiple user-selected content channels selected by the second user, a third channel permission and a second timestamp, via the communication interface to the second mobile device, such that the second mobile device is able to access content at the second content provider of the multiple content providers corresponding to the third channel ID prior to a third expiration date that is based on the third timestamp.

12. The first network device of claim 9, wherein, the first UDID and the first set of multiple user-selected content channels selected by the first user are received from a second network device in response to the first user signing in to a network service at the second network device, wherein the second network device is different than the first network device and is associated with a provider of network services.

13. The first network device of claim 12, wherein the processing unit is further configured to:
obtain, when the first UDID and the first set of multiple user-selected content channels selected by the first user are received from the second network device, the first timestamp, and
store, in the database, the first timestamp in association with the first UDID and the first channel subscription data.

14. The method of claim 1, wherein the first set of multiple user-selected content channels selected by the first user comprises a network service subscription that is different than the first user's network service subscription associated with receiving the second set of content channels via the first set-top box connected to the television.

15. A method, comprising:
executing, at a mobile device, an application related to accessing and viewing content;
receiving, via the executing application at the mobile device, user selections of a plurality of different content channels, with each of the plurality of different content channels being deliverable by a different one of a plurality of content devices, wherein each of the plurality of content devices is associated with a different one of a plurality of content delivery providers, wherein receiving the user selections of the plurality of different content channels comprises:
receiving, via the executing application at the mobile device, a first user-selected content channel of the plurality of different content channels, wherein the first user-selected content channel is deliverable by a first content device of the plurality of content devices and is associated with a first content delivery provider of the plurality of content delivery providers; and
receiving, via the executing application at the mobile device, a second user-selected content channel of the plurality of different content channels, wherein the second user-selected content channel is deliverable by a second content device of the plurality of content devices and is associated with a second content delivery provider of the plurality of content delivery providers;
sending messages, that include a unique identifier associated with the mobile device and channel identifiers associated with the user-selected plurality of different content channels, to a network device that is different than the plurality of content devices, wherein sending the messages further comprises:
sending a first message, that includes the unique identifier associated with the mobile device and a first channel identifier associated with the first user-selected content channel, to the network device; and
sending a second message, that includes the unique identifier associated with the mobile device and a second channel identifier associated with the second user-selected content channel, to the network device;
receiving, at the executing application at the mobile device from the network device and responsive to sending the messages, timestamps and user subscription confirmations associated with each of the user-selected plurality of different content channels, wherein receiving the timestamps and the user subscription confirmations comprises:
receiving, at the executing application at the mobile device from the network device and responsive to sending the first message, a first timestamp of the timestamps and a first user subscription confirmation of the user subscription confirmations, and
receiving, at the executing application at the mobile device from the network device and responsive to sending the second message, a second timestamp of the timestamps and a second user subscription confirmation of the user subscription confirmations; and
accessing, at each different one of the plurality of the content devices via the executing application and using the unique identifier and the timestamps, content that corresponds to each of the plurality of different content channels, wherein the accessing the content comprises:
accessing, at the first content device of the plurality of content devices via the executing application and using the unique identifier and the first timestamp, first content that corresponds to the first user-selected content channel, and
accessing, at the second content device of the plurality of content devices via the executing application and using the unique identifier and the second timestamp, second content that corresponds to the second user-selected content channel,
wherein the first content comprises first streaming media and wherein the second content comprises second streaming media, and
wherein accessing the first content comprises receiving, at the application executing at the mobile device from the first content device associated with a first content delivery provider of the plurality of content delivery providers, the first streaming media associated with the first user-selected content channel, and
wherein accessing the second content comprises receiving, at the application executing at the mobile device from the second content device associated with a second content delivery provider of the plurality of content delivery providers, the second streaming media associated with the second user-selected content channel.

16. The method of claim 15, wherein the user-selections of the plurality of the different content channels are received at the mobile device from a first user.

\* \* \* \* \*